(12) United States Patent  
Chmiel et al.

(10) Patent No.: US 11,234,220 B2  
(45) Date of Patent: Jan. 25, 2022

(54) ALLOCATION OF RESOURCES IN PHYSICAL UPLINK CONTROL CHANNELS

(71) Applicant: NOKIA SOLUTIONS AND NETWORKS OY, Espoo (FI)

(72) Inventors: Mieszko Chmiel, Wroclaw (PL); Grzegorz Ciolkowski, Wroclaw (PL); Lukasz Rygiel, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 859 days.

(21) Appl. No.: 15/286,304

(22) Filed: Oct. 5, 2016

(65) Prior Publication Data

US 2018/0098315 A1 Apr. 5, 2018

(51) Int. Cl.
  *H04W 4/00* (2018.01)
  *H04W 72/04* (2009.01)
  *H04L 5/00* (2006.01)

(52) U.S. Cl.
  CPC ....... *H04W 72/0413* (2013.01); *H04L 5/0053* (2013.01); *H04W 72/0446* (2013.01); *H04L 5/0048* (2013.01)

(58) Field of Classification Search
  USPC ................................. 370/329, 280, 281, 336
  See application file for complete search history.

(56) References Cited

U.S. PATENT DOCUMENTS

| 9,258,832 | B2 | 2/2016 | Noh et al. |
| 9,680,619 | B2* | 6/2017 | Ro ........................... H04L 5/005 |
| 2012/0046032 | A1* | 2/2012 | Baldemair ............ H04L 5/0053 455/434 |
| 2012/0099545 | A1* | 4/2012 | Han ....................... H04L 1/0028 370/329 |
| 2012/0106478 | A1 | 5/2012 | Han et al. |
| 2013/0094457 | A1 | 4/2013 | Seo et al. |
| 2013/0301564 | A1 | 11/2013 | Chen et al. |
| 2014/0078942 | A1 | 3/2014 | Noh et al. |
| 2015/0195063 | A1 | 7/2015 | Ro et al. |
| 2015/0341864 | A1 | 11/2015 | Yang et al. |

(Continued)

FOREIGN PATENT DOCUMENTS

CN 103828457 A 5/2014
EP 2 536 050 A2 12/2012

(Continued)

OTHER PUBLICATIONS

European Patent Office, Partial International Search Report corresponding to International Application No. PCT/EP2017/074292, dated Dec. 1, 2017.

(Continued)

*Primary Examiner* — Phuongchau Ba Nguyen
(74) *Attorney, Agent, or Firm* — Squire Patton Boggs (US) LLP

(57) ABSTRACT

Various communication systems may benefit from carrier aggregation. For example, carrier aggregation may benefit from improved resource allocation. A method, in certain embodiments, includes allocate resources in a subframe so as to avoid at least one of a first resource or a last resource in the subframe. The subframe does not comprise a sounding reference signal. The method also includes sending a message comprising the resource allocation of the subframe to a user equipment.

13 Claims, 5 Drawing Sheets

(56) References Cited

U.S. PATENT DOCUMENTS

2018/0048498 A1* 2/2018 Stern-Berkowitz ......................... H04L 27/0006
2018/0270011 A1   9/2018 Yang et al.

FOREIGN PATENT DOCUMENTS

| | | |
|---|---|---|
| EP | 3 131 224 A1 | 2/2017 |
| JP | 2013/534098 A | 8/2013 |
| JP | 2015/534344 A | 11/2015 |
| WO | 2016025836 A1 | 2/2016 |
| WO | 2016111599 A1 | 7/2016 |

OTHER PUBLICATIONS

3GPP TS 36.211 V12.6.0 (Jun. 2015); 3rd Generation Partnership Project; Technical Specification Group Radio Access Network; Evolved Universal Terrestrial Radio Access (E-UTRA); Physical channels and modulation (Release 12).
3GPP TS 36.212 V12.5.0 (Jun. 2015); 3rd Generation Partnership Project; Technical Specification Group Radio Access Network; Evolved Universal Terrestrial Radio Access (E-UTRA); Multiplexing and channel coding (Release 12).
3GPP TS 36.213 V12.6.0 (Jun. 2015); 3rd Generation Partnership Project; Technical Specification Group Radio Access Network; Evolved Universal Terrestrial Radio Access (E-UTRA); Physical layer procedures (Release 12).
Notification of Reasons for Rejection (final) dated Dec. 21, 2020 corresponding to Japanese Patent Application No. 2019-517794, with Concise Statement of Relevance/Partial Translation.
Notification of the First Office Action dated Mar. 17, 2021 corresponding to Chinese Patent Application No. 201780061827.5, with English Summary thereof.
Japanese Office Action issued in corresponding Japanese Patent Application No. 2019-517794 dated May 18, 2020.
Korean Office Action issued in corresponding Korean Patent Application No. 10-2019-7012762 dated Jun. 1, 2020.
Communication pursuant to Rule 164(2)(b) and Article 94(3) EPC dated Oct. 28, 2021 corresponding to European Patent Application No. 17777004.7.

\* cited by examiner

| TTI number | 0 | 1 | 2 | 3 | 4 | 5 | 6 | 7 | 8 | 9 | 10 |
|---|---|---|---|---|---|---|---|---|---|---|---|
| PUCCH Format 3 resource # | 0 | 8 | 8 | 8 | 8 | 8 | 8 | 8 | 8 | 8 | 8 |
| | 1 | 2 | 2 | 2 | 2 | 2 | 2 | 2 | 2 | 2 | 2 |
| | 2 | 1 | 1 | 1 | 1 | 1 | 1 | 1 | 1 | 1 | 1 |
| | 3 | 4 | 4 | 4 | 4 | 4 | 4 | 4 | 4 | 4 | 4 |
| | 4 | 4 | | | | | | | | | |
| | 5 | 3 | 3 | 3 | 3 | 3 | 3 | 3 | 3 | 3 | 3 |
| | 6 | 7 | 7 | 7 | 7 | 7 | 7 | 7 | 7 | 7 | 7 |
| | 7 | 5 | 5 | 5 | 5 | 5 | 5 | 5 | 5 | 5 | 5 |
| | 8 | 6 | 6 | 6 | 6 | 6 | 6 | 6 | 6 | 6 | 6 |
| | 9 | | | | | | | | | | |

Figure 3

ALLOCATION OF RESOURCES IN PHYSICAL UPLINK CONTROL CHANNELS

BACKGROUND

Field

Various communication systems may benefit from improved resource allocation. For example, carrier aggregation may benefit from avoiding the allocation of resources in physical uplink control channels.

Description of the Related Art

3rd Generation Partnership Project (3GPP) technologies, such as LTE Advanced (LTE-A), or other subsequent 3GPP LTE releases, may utilize carrier aggregation. Carrier aggregation can help to improve the overall capacity of the network by increasing the transmission and/or reception bandwidth through aggregation of a number of separate cells or carriers. To allow a user equipment (UE) to use the additional cells, secondary cells may need to be added by radio resource control (RRC) and then activated by Media Access Control (MAC).

Some of the benefits of carrier aggregation include increasing peak data rates, possible aggregation of fragmented spectrum, and fast load balancing. As part of carrier aggregation, 3GPP technologies provide for use of a physical uplink control channel (PUCCH). A new PUCCH format was introduced in LTE Release-10 for the purpose of UE feedback for Carrier Aggregation. In particular, PUCCH format 3 was introduced for use, for example, when the UE is aggregated with two or more secondary cells (SCells).

SUMMARY

A method, in certain embodiments, may include allocating resources in a subframe so as to avoid at least one of a first resource or a last resource in the subframe. The subframe does not comprise a sounding reference signal. The method may also include sending a message comprising the resource allocation of the subframe to a user equipment.

According to certain embodiments, an apparatus may include at least one memory including computer program code, and at least one processor. The at least one memory and the computer program code may be configured, with the at least one processor, at least to allocate resources in a subframe so as to avoid at least one of a first resource or a last resource in the subframe. The subframe does not comprise a sounding reference signal. The at least one memory and the computer program code may also be configured, with the at least one processor, to cause the apparatus at least to send a message comprising the resource allocation of the subframe to a user equipment.

An apparatus, in certain embodiments, may include means for allocating resources in a subframe so as to avoid at least one of a first resource or a last resource in the subframe. The subframe does not comprise a sounding reference signal. The apparatus also includes means for sending a message comprising the resource allocation of the subframe to a user equipment.

According to certain embodiments, a non-transitory computer-readable medium encoding instructions that, when executed in hardware, perform a process. The process may include allocating resources in a subframe so as to avoid at least one of a first resource or a last resource. The subframe does not comprise a sounding reference signal subframe. The process may also include sending a message comprising the resource allocation of the subframe to a user equipment.

According to certain embodiments, a computer program product encoding instructions for performing a process according to a method including allocating resources in a subframe so as to avoid at least one of a first resource or a last resource. The subframe does not comprise a sounding reference signal. The method also may include sending a message comprising the resource allocation of the subframe to a user equipment.

A method, in certain embodiments, may include receiving at a user equipment allocated uplink resources from an access node. The method may also include causing the transmission of a subframe that does not comprise a sounding reference signal from the user equipment to the access node using the allocated uplink resources. The allocated resources do not comprise at least one of a first resource or a last resource in the subframe.

According to certain embodiments, an apparatus may include at least one memory including computer program code, and at least one processor. The at least one memory and the computer program code may be configured, with the at least one processor, to cause the apparatus at least to receive at a user equipment allocated uplink resources from an access node. The at least one memory and the computer program code may also be configured, with the at least one processor, to cause the apparatus at least to cause a transmission of a subframe that does not comprise a sounding reference signal from the user equipment to the access node using the allocated uplink resources. The allocated resources do not comprise at least one of a first resource or a last resource in the subframe.

An apparatus, in certain embodiments, may include means for receiving at a user equipment allocated uplink resources from an access node. The apparatus may also include means for causing the transmission of a subframe that does not comprise a sounding reference signal from the user equipment to the access node using the allocated uplink resources. The allocated resources do not comprise at least one of a first resource or a last resource in the subframe.

According to certain embodiments, a non-transitory computer-readable medium encoding instructions that, when executed in hardware, perform a process. The process may include receiving at a user equipment allocated uplink resources from an access node. The process may also include causing the transmission of a subframe that does not comprise a sounding reference signal from the user equipment to the access node using the allocated uplink resources. The allocated resources do not comprise at least one of a first resource or a last resource in the subframe.

According to certain embodiments, a computer program product encoding instructions for performing a process according to a method including receiving at a user equipment allocated uplink resources from an access node. The method may also include causing a transmission of a subframe that does not comprise a sounding reference signal from the user equipment to the access node using the allocated uplink resources. The allocated resources do not comprise at least one of a first resource or a last resource in the subframe.

BRIEF DESCRIPTION OF THE DRAWINGS

For proper understanding of the invention, reference should be made to the accompanying drawings, wherein:

FIG. 3 illustrates a diagram according to certain embodiments.

DETAILED DESCRIPTION

Figure 1:
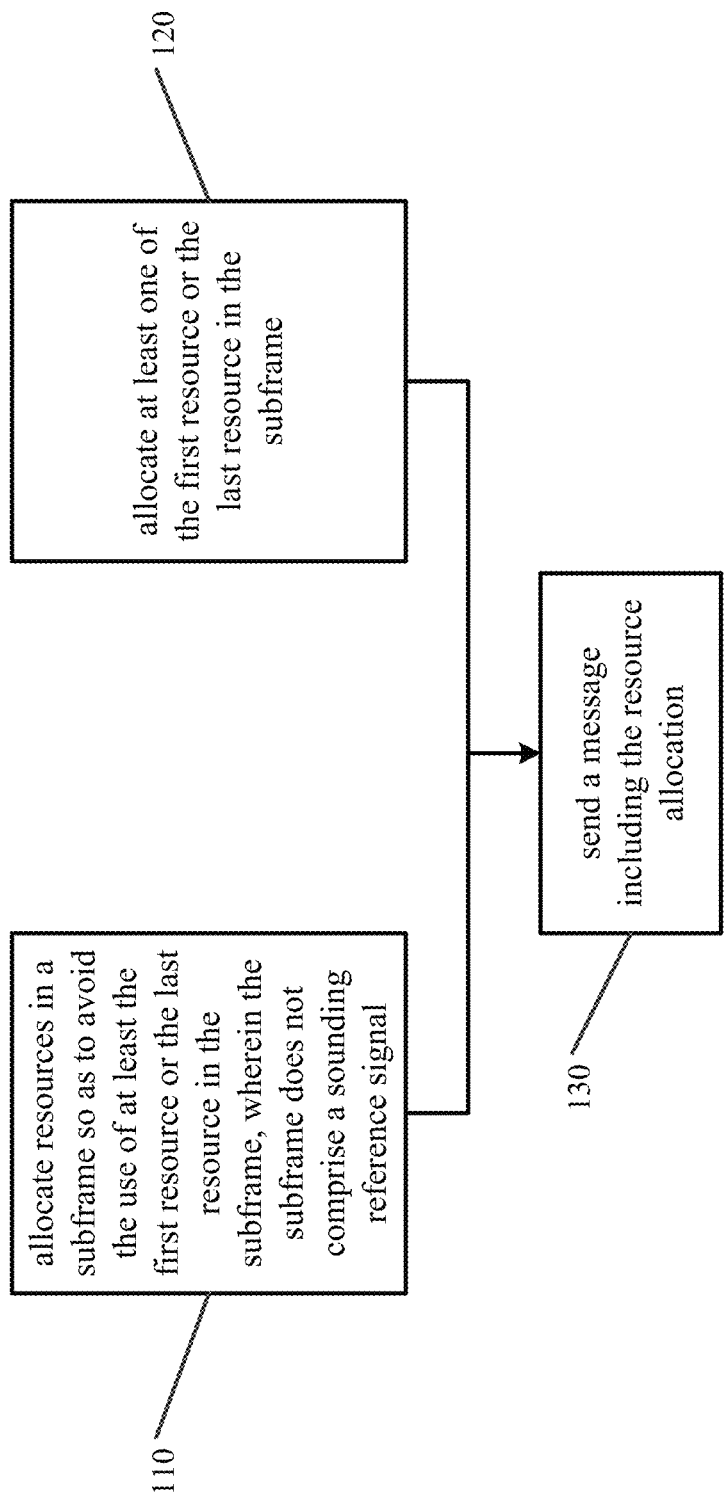
FIG. 1 illustrates a flow diagram according to certain embodiments.

Certain embodiments can help to improve the handling of potential or current colliding resources in the PUCCH format 3. Certain embodiments may allow for allocating resources to avoid sounding reference signal (SRS) related collisions. In certain embodiments, an access node may assign four PUCCH Format 3 (F3) resources per carrier aggregation UE via a layer 3 (L3) RRC. In a given transmission time interval (TTI), when the UE may be scheduled for a downlink (DL) transmission on at least one SCell, one of the four resources may be selected and indicated to the UE by Layer 1 (L1) or Layer 2 (L2) Downlink Control Information (DCI) and/or Physical Downlink Control Channel (PDCCH) signaling. For example, the assignment of the transmit power control (TPC) command for the PUCCH field in the DCI/PDCCH may be used.

As described in 3GPP TS 36.211, sections 5.4.2A and 5.4.3, five PUCCH F3 resources may be available per physical resource block (PRB) pair in a non-SRS subframe. 3GPP TS 36.211 is hereby incorporated by reference in its entirety. In cell-specific SRS subframes, the first and the last PUCCH F3 resource of a PRB pair may collide with each other, as explained in 3GPP TS 36.211, section 5.4.2A. 3GPP TS 36.213 is also hereby incorporated by reference in its entirety. In certain embodiments, the access node may help to facilitate collision avoidance.

In some embodiments, the UE may use a PUCCH F3 resource in a given TTI to provide feedback, such as a positive acknowledgement (ACK) or a negative acknowledgment (NACK), to a cell. When the cell is a primary cell (PCell), no other UE can use the same resource used by the UE to provide feedback within the same TTI on the same cell. If a UE gets a PUCCH F3 resource assigned by a downlink assignment due to a downlink transmission on a SCell in a TTI, the UE may want to utilize the same resource by the downlink assignment corresponding to the downlink transmission on at least one addition SCell in the same TTI, as explained in 3GPP TS 36.213, section 10.1.2.2.2. Otherwise, the UE may treat the multiple downlink assignments, resulting from downlink transmissions on multiple SCell, as inconsistent downlink PDCCH information, and the downlink transmission may fail.

The above features may create a signaling environment in which allocating resources in the PUCCH F3 may help to avoid any potential SRS collisions. Certain embodiments may avoid collisions in PUCCH F3 of non-SRS subframes by avoiding the use of the first and/or last resources in a subframe. Use may be avoided, in some embodiments, if the avoidance of such resources will not negatively impact or affect performance. Performance, for example, may relate to the functioning of the access node, the UE, and/or the cell in which either the access node or the UE are located. In some embodiments, a negative performance may be when a number of the user equipment per subframe multiplexed in a control channel is reduced.

FIG. 1 illustrates a flow diagram according to certain embodiments. Specifically, FIG. 1 illustrates an embodiment of an apparatus, such as an access node. The access node may be a base station, an evolved Node B (eNB), server, host, or any of the other access or network node discussed herein. The access node may avoid using the first and/or last resource in a subframe that does not include a sounding reference signal, even in subframes when the resources are orthogonal. In other words, even when a given resource may not presently collide with another resource, the access node may prefer not to use the given resource if it may potentially collide in the future. Therefore, even though a resource may be collision free or orthogonal, the access node may simply avoid such resources all together.

In some embodiment, the UE may not use at least one of the first or the last resource in a given subframe, even when the subframe does not include a sounding reference signal. The colliding resources may therefore be at least one of the first or the last resource in a given subframe. Colliding resources are those resources that may be scheduled for transmission using the same resources, such as frequency, orthogonal code, and/or time resources. Non-SRS subframes may have first and last resource use different orthogonal codes. SRS subframes, on the other hand, may have first and the last resource that can collide as they use same orthogonal code. Collision free resources may therefore refer to non-SRS subframe, where first and last resource use different orthogonal codes.

In certain embodiments, the access node may determine the impact or effect on the performance of the access nodes, UE, and/or cell if the access node is avoiding the use of collision free resources in resource allocation. When avoiding the use of the collision free resources does not reduce the number of UEs per subframe multiplexed in a control channel, or does not have a negative impact or effect on performance of the access node, UE, and/or cell, the access node may allocate resources in a non-SRS subframe to avoid the use of the first resource and/or last resource as shown in step 110. Performance impact may be determined or calculated by any network entity in the network, including a network entity other than the access node. A negative performance impact, therefore, may be a reduction of the number of UEs per subframe multiplexed in a control channel. In certain embodiments, the control channel is PUCCH format 3.

A non-SRS subframe may be a subframe that does not comprise a SRS. For example, in an SRS subframe, last SC-FDMA symbol of the subframe is used by the SRS. In a non-SRS subframe, on the other hand, the last SC-FDMA symbols may be used for a physical uplink shared channel (PUSCH) and/or a physical uplink control channel (PUCCH).

In some embodiments, avoiding collision free resources may be said to have no negative impact when the number of UEs per TTI is not reduced. In other words, the avoiding collision free resources may be said to not reduce the number of UEs per subframe multiplexed in a control channel Avoiding the use of collision free resources, for example, may mean that the first resource and/or the last resource in a subframe are not allocated. In certain embodiments involving PUCCH F3, avoiding the collision free resources may include not allocating the first resource and/or the last resource of at least one PRB-pair, regardless of whether one or more PUCCH F3 PRB-pairs are configured in a PCell. In certain embodiments, a single UE may not use the first and/or last resources, as determined by an access node, while in other embodiments a plurality or all of the UEs in a given cell or network may use the first and/or last resources.

The access node may, in certain embodiments, determine that avoiding the use of the collision free resources may have a negative impact. For example, there may be a shortage of available bandwidth, and avoiding the use of collision free resources, for example the first and/or last resource, may act to further lower the available bandwidth. In such an embodiment, rather than avoiding the use of collision free resources, the access node may choose to allocate the first and/or last resource in the subframe to the UE, as shown in step 120. The allocated resources may be included in a format 3 physical uplink control channel. In step 130, the access node may send a message that includes the resource allocation of the subframe to the user equipment. In some embodiments, the access node may be serving a primary cell.

Figure 2:
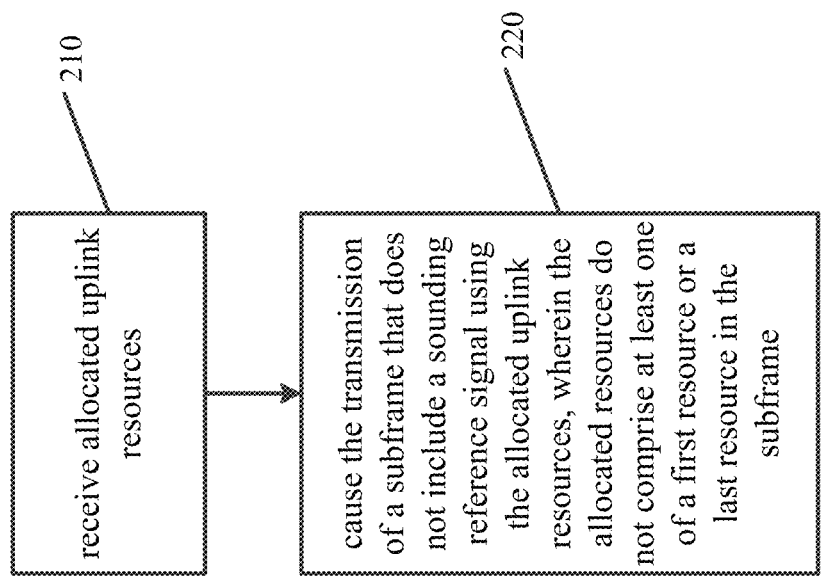
FIG. 2 illustrates a flow diagram according to certain embodiments.

FIG. 2 illustrates a flow diagram according to certain embodiments. Specifically, FIG. 2 illustrates an embodiment of an apparatus, such as a user equipment (UE). The UE may receive a message or a signal from an access node that includes an allocation of uplink resources, as shown in step 210. In step 220, the user equipment may cause the transmission of a non-SRS subframe, a signal, and/or a channel, not having a SRS using the allocated uplink resources. The resources may be allocated in such a way so that the first and/or last resources are avoided or not included in the non-SRS subframe, which may be a subframe in which an SRS is not sent. In other words, in non-SRS subframe allocation of the first and/or last resource within the PRB-pair, for example, 0 and 4 for PRB1 and 5 and 9 for PRB2, may be avoided.

In certain embodiments, a PUCCH F3 resource assignment algorithm may be used to determine resource allocation based on the impact or effect of avoiding the collision free resources. The algorithm may input the number of PRB-pairs configured for PUCCH F3 resources. For example, if one PRB pair is available for PUCCH F3, the maximum number of PUCCH F3 resources possible to allocate in current TTI may be 5. In another example, if two PRB pair is available for PUCCH F3, the maximum number of PUCCH F3 resources possible to allocate in current TTI may be 10. The above inputs may be individually inputted into the algorithm, or two or more of the inputs may be combined in any way and then inputted into the algorithm.

Figure 4:
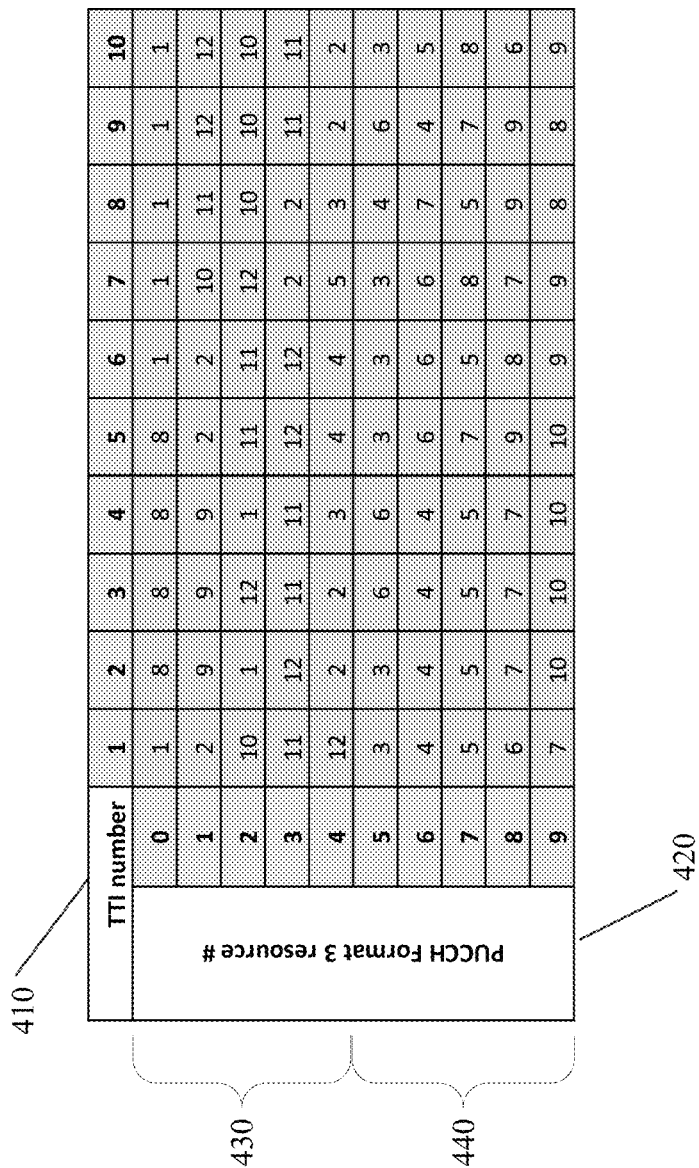
FIG. 4 illustrates a diagram according to certain embodiments.

In certain embodiments, the algorithm may produce an output that defined the PUCCH F3 resource assignment for UEs in a given time span. The output of the algorithm may be in the form of a matrix, or any other type of table, chart, or graph. FIGS. 3 and 4 illustrate examples of the outputted matrix produced by the algorithm.

FIG. 3 illustrates a diagram according to certain embodiments. Specifically, FIG. 3 illustrates resources allocation when an access node has determined that avoiding the use of the first and/or last resource in a non-SRS subframe may not reduce the number of UEs per subframe multiplexed in a control channel FIG. 3 is an example of an output of the resource assignment algorithm, in which the matrix defines the PUCCH F3 resource assignment to the UEs in a time span of ten consecutive TTIs. As can be seen in FIG. 3, the x-axis lists the time of ten TTIs 310, while the y-axis lists PUCCH F3 resources 320 numbering between 0 to 9.

If only one PRB pair is configured for PUCCH F3, five PUCCH F3 resources may be available. If, however, two PRB pairs are configured for PUCCH F3, ten PUCCH F3 resources may be available. Each additional PRB pair can make available an additional five resources. Each field in the matrix may indicate the UE assigned to a given PUCCH F3 resource in a given TTI. PUCCH F3 resources 320 may then be assigned to UEs in each TTI 310. In certain embodiments, resources 0, 1, 2, 3, and 4 may belong to a first PRB-pair 330, while resources 5, 6, 7, 8, and 9 may belong to a second PRB-pair 340.

In the embodiment shown in FIG. 3, eight full buffer UEs (numbering between 1 and 8) can be assigned PUCCH F3 resources 0, 1, 2, 3, 5, 7, and 8. Resources 4 and 9 may not be used in order to avoid potential SRS impact. In certain embodiments, resources 4 and 9 may have been blanked or avoided in accordance with step 110 of FIG. 1. In other words, because the performance impact of avoiding resources 4 and 9 is not negative, or because the number of the user equipment per subframe multiplexed in a control channel is not reduced, the use of collision free resources 4 and 9 may be avoided. In some embodiments, the number of UEs may be lower than the number of PUCCH F3 orthogonal codes or resources per subframe.

FIG. 4 illustrates a diagram according to certain embodiments. Specifically, FIG. 4 illustrates resource allocation when the performance impact of avoiding the use of collision free resources is negative. For example, an access node may determine that avoiding the use of the first and/or last resource in a non-SRS subframe may reduce the number of UEs per subframe multiplexed in a control channel. As shown in step 120, when the avoiding the use of collision free resources is negative, the collision free resources may be allocated.

In the resource allocation shown in FIG. 4, twelve full buffer UEs (numbering from 1-12) are assigned to all ten PUCCH F3 resources 420 in each TTI 410. Although resource pairs with numbers 0 and 4 or 5 and 9 are colliding with each other in SRS subframes, the resources are allocated to UEs in non-SRS subframes. In certain embodiments, the resources 4 and 9 are allocated because avoiding the use of the resources, and not allocating them, can have a negative impact on performance, for example, by reducing the number of UEs per subframe multiplexed in a control channel. In certain embodiments, resources 0, 1, 2, 3, and 4 may belong to a first PRB-pair 430, while resources 5, 6, 7, 8, and 9 may belong to a second PRB-pair 440.

Figure 5:
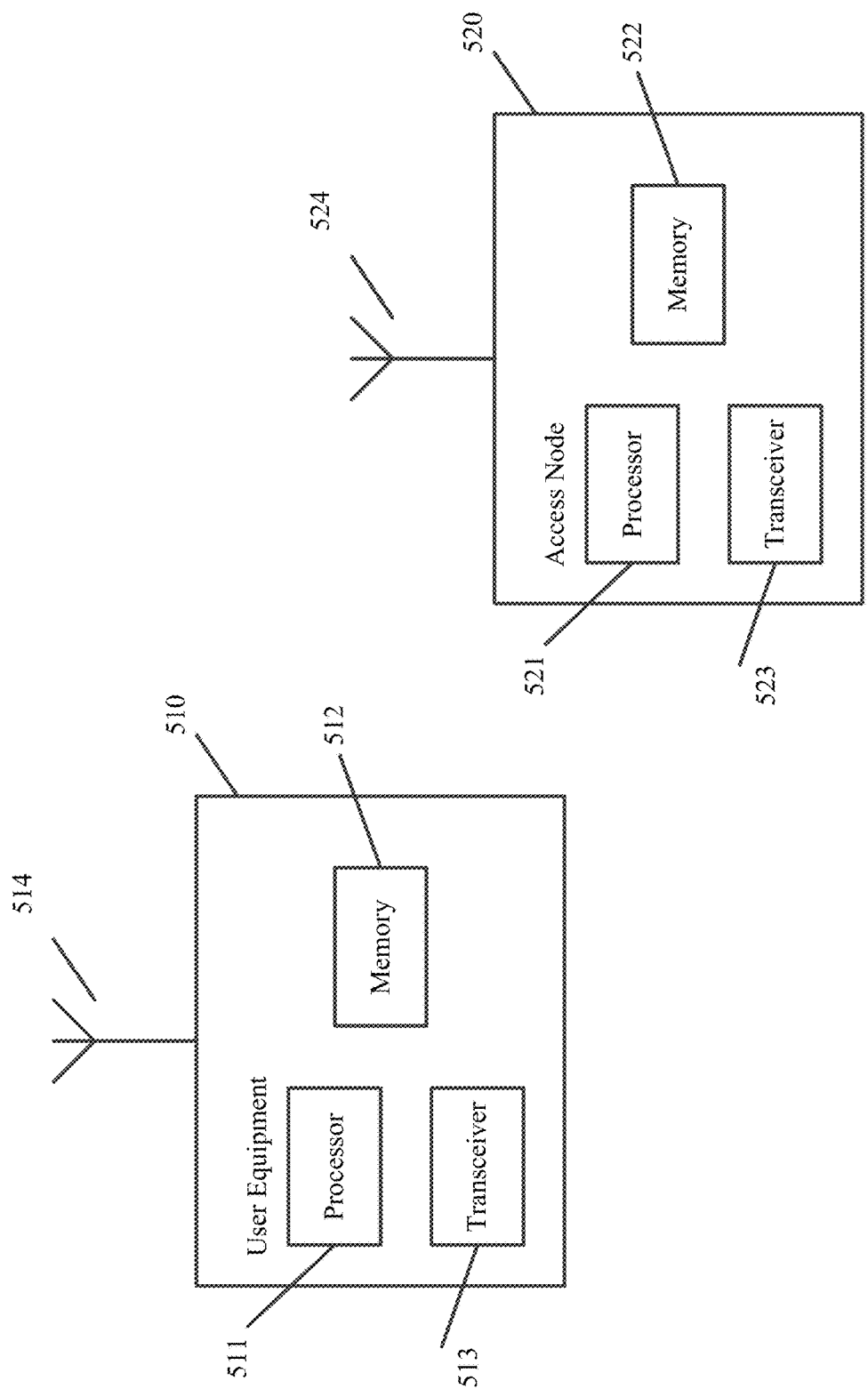
FIG. 5 illustrates a system according to certain embodiments.

FIG. 5 illustrates a system according to certain embodiments. It should be understood that each of the signals and functions shown in FIGS. 1, 2, 3, and 4 may be implemented by various means or their combinations, such as hardware, software, firmware, one or more processors and/or circuitry. In one embodiment, a system may include several devices, such as, for example, access node 520 or UE 510. The system may include more than one UE 510 and more one access node 520, although only one access node shown for the purposes of illustration. An access node may be a base station, an eNB, server, host, or any of the other access or network node discussed herein.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, access node 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or UE 510 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 1, 2, 3, and 4. In certain embodiments, at least one memory including computer program code can be configured to, with the at least one processor, cause the apparatus at least to perform any of the processes described herein.

According to certain embodiments, an apparatus 520 may include at least one memory 522 including computer program code, and at least one processor 521. The at least one memory 522 and the computer program code are configured, with the at least one processor 521, to cause the apparatus 520 at least to allocate resources in a subframe so as to avoid the use of at least one of a first resource or a last resource in the subframe. The subframe may not include a sounding reference signal. In addition, the at least one memory 522 and the computer program code are configured, with the at least one processor 521, to cause the apparatus 520 at least to send the allocated resources to a user equipment. Apparatus 520 may comprise an access node, a base station, an eNB, or a server.

According to certain embodiments, an apparatus 510 may include at least one memory 512 including computer program code, and at least one processor 511. The at least one memory 512 and the computer program code are configured, with the at least one processor 511, to cause the apparatus 510 at least to receive at a user equipment allocated uplink resources from an access node. The at least one memory 512 and the computer program code may be configured, with the at least one processor 511, to also cause the apparatus 510 at least to cause a transmission of a subframe that may not include a sounding reference signal from the user equipment to the access node using the allocated uplink resources. The allocated resources do not comprise at least one of a first resource or a last resource in the subframe. Apparatus 510 may comprise a user equipment.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as access node 520 or UE 510, to perform any of the processes described above (see, for example, FIGS. 1, 2, 3, and 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 5 illustrates a system including an access node 520 and UE 510, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 510 may likewise be provided with a variety of configurations for communication other than communication access node 520. For example, the UE 510 may be configured for device-to-device communication.

The above embodiments may reduce scheduling blocking probability, and increase UE throughput. The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to a LTE-A environment, other embodiments can be directed to any LTE environment.

PARTIAL GLOSSARY

3GPP The 3rd Generation Partnership Project
ACK Positive Acknowledgment
CA Carrier Aggregation
DCI Downlink Control Information
DL Downlink
eNB Evolved Node B
F1bwcs Format 1b with Channel Selection
F3 Format 3
L1 Layer 1
L2 Layer 2
L3 Layer 3
LTE Long Term Evolution
LTE-A Long Term Evolution Advanced
MAC Medium Access Control
NACK Negative Acknowledgment
PCell Primary Cell
PDCCH Physical Downlink Control Channel
PUCCH Physical Uplink Control Channel
PRB Physical Resource Block
Rel Release
RRC Radio Resource Control
SCell Secondary Cell
TD Time Domain
TPC Transmit Power Control
TTI Transmission Time Interval
UE User Equipment
UL Uplink

We claim:

1. An apparatus, comprising:
at least one memory comprising computer program code;
at least one processor;
wherein the at least one memory and the computer program code are configured, with the at least one processor, to cause the apparatus at least to:
allocate resources in a subframe so as to avoid at least one resource index per resource block in the subframe, where a same resource index is avoided when the subframe does not comprise a sounding reference signal; and
send a message comprising the resource allocation of the subframe to a user equipment.

2. The apparatus according to claim 1, wherein the allocated resources are included in a format 3 physical uplink control channel.

3. The apparatus according to claim 1, wherein the at least one memory and the computer program code are configured, with the at least one processor, to cause the apparatus at least to determine at an access node a performance impact of avoiding a use of at least one of the first resource or the last resource in the subframe.

4. The apparatus according to claim 1, wherein the allocating of resources is avoided in at least one of the first resource or the last resource when a number of the user equipment per subframe multiplexed in a control channel is not reduced.

5. The apparatus according to claim 1, wherein the allocated resources do not comprise the resource index even when the sounding reference signal is not sent in the subframe.

6. The apparatus according to claim 1, wherein the access node is serving a primary cell.

7. The apparatus according to claim 1, wherein the apparatus comprises an access node, a base station, an evolved Node B, or a server.

8. A method, comprising:
allocating resources in a subframe so as to avoid the use of at least one resource index per resource block in the subframe, where a same resource index is avoided when the subframe does not comprise a sounding reference signal; and
causing a transmission of a message comprising the resource allocation of the subframe to a user equipment.

9. The method according to claim 8, wherein the allocated resources are included in a format 3 physical uplink control channel.

10. The method according to claim 8, further comprising determining at an access node a performance impact of avoiding a use of at least one of the first or the last resource in the subframe.

11. The method according to claim 8, wherein the allocating of resources is avoided in at least one of the first resource or the last resource when a number of the user equipment per subframe multiplexed in a control channel is not reduced.

12. The method according to claim 8, wherein the allocated resources do not comprise the resource index even when the sounding reference signal is not sent in the subframe.

13. The method according to claim 8, wherein the access node is serving a primary cell.

* * * * *